US005096538A

United States Patent [19]

[11] Patent Number: 5,096,538

[45] Date of Patent: Mar. 17, 1992

Naitoh

[54] VACUUM DRYING METHOD

[75] Inventor: Kenji Naitoh, Minami-Ashigara, Japan

[73] Assignee: Fuji Photo Film Co., Ltd., Kanagawa, Japan

[21] Appl. No.: 466,647

[22] Filed: Jan. 17, 1990

[30] Foreign Application Priority Data

Jan. 20, 1989 [JP] Japan .................................... 1-11618

[51] Int. Cl.[5] ........................ B01D 1/24; B01D 3/10; B01D 3/34

[52] U.S. Cl. .................................. 159/47.1; 159/26.1; 159/49; 159/DIG. 10; 159/DIG. 16; 203/1; 203/50; 203/89; 203/91; 403/270; 403/904; 562/485

[58] Field of Search .................. 203/1, 91, 89, 50, 60; 159/47.1, DIG. 10, DIG. 16, 26.1, 49; 430/270, 904, 548; 585/833; 562/485

[56] References Cited

U.S. PATENT DOCUMENTS

| | | | |
|---|---|---|---|
| 3,926,911 | 12/1975 | Greber et al. | 525/431 |
| 4,219,669 | 8/1980 | Tsuchiya et al. | 562/486 |
| 4,230,886 | 10/1980 | Tsuchiya et al. | 562/486 |
| 4,254,194 | 3/1981 | Merrill et al. | 430/285 |
| 4,273,855 | 6/1981 | Jaeken et al. | 430/242 |
| 4,756,998 | 7/1988 | Helling et al. | 430/548 |
| 4,816,368 | 3/1989 | Skaggs | 430/138 |
| 4,857,961 | 8/1989 | Ogiso et al. | 355/27 |
| 4,865,942 | 9/1989 | Gottschalk et al. | 430/281 |
| 4,891,298 | 1/1990 | Waller | 430/221 |
| 4,900,782 | 2/1990 | Han et al. | 525/398 |

FOREIGN PATENT DOCUMENTS

| | | |
|---|---|---|
| 58-79501 | 5/1983 | Japan . |
| 60-64108 | 4/1985 | Japan . |
| 60-90001 | 5/1985 | Japan . |
| 61-14777 | 4/1986 | Japan . |
| 62-192471 | 8/1987 | Japan . |

*Primary Examiner*—Virginia Manoharan
*Attorney, Agent, or Firm*—Birch, Stewart, Kolasch & Birch

[57] ABSTRACT

A vacuum drying method wherein a solution of a material to be dried which has been adjusted to 1–50 centipoise, is supplied to a steam-heated long tube, solid-vapor mixture of powdery dry material and vapor produced in the tube is blown out under reduced pressure, and the powdery dry material and vapor are separated so as to obtain powdery dry material.

9 Claims, 1 Drawing Sheet

VACUUM DRYING METHOD

BACKGROUND OF THE INVENTION

1. Field of the Invention

The present invention relates to a method of obtaining a powdery material from a solution of a material to be dried.

2. Description of the Related Art

Various methods have been proposed in the past to obtain a powdery material, for example, powdery polymerizate from, a solution of a material to be dried, for example, polymerizate. For example, in one method using a centrifugal thin film evaporator, a polymerizate is extracted in the molten state and then cooled and solidified. In another method, the solution is coated in the form of a sheet on a belt in a band drier, and a dry powder is obtained. The former method, however, has the disadvantages that the viscosity rises sharply so that the material cannot be drawn off, and as operations are carried out at high temperature, deteriorations occur which are undesirable from the viewpoint of quality. The latter method, on the other hand, suffers from the disadvantage that due to a sharp rise in viscosity, the volatile constituents cannot be completely evaporated.

In addition, in another conventional method known as reprecipitation, a solution of the polymerizate is dripped into a solvent which is a poor solvent for the polymerizate but a good solvent for the solvent in which the polymerizate is dissolved. This precipitates the polymerizate, which is then filtered and dried. As this method requires a very large amount of solvent, however, it requires a large tank and productivity therefore declines. Further, the mother liquors from filtration must also be treated, and the method is thus not economical.

Another method uses a heated long tube as described in, for example, JP A-58-79501 and JP-A 60-90001 ("JP-A-" means Unexamined Published Japanese Patent Application). In this method, the solution containing a volatile component and a component which is difficult to volatize is evaporated in a heated evaporator, and supplied continuously to a cooling crusher. In the crusher, the component which is difficult to volatize is cooled, solidified and crushed while volatile components remaining in said non volatile components are further evaporated.

There are, however, various problems in attempting to dry a polymerizate solution by means of a heated long tube. When polymerizate solution supplied at a constant flow rate is blown from said tube into a reduced pressure vessel, the product obtained is often a sticky solution containing 10–20 wt % of residual volatile components, or a massive material which contains sticky solution and is not yet dry. Even if the operating conditions and equipment conditions are varied, it only produces a slight change in the volatile components, and a dry material that can be handled as a powder is not easily obtained. Furthermore, if the product of blowing is a sticky solution and a massive material containing a sticky solution, it is extremely difficult to remove it from the reduced pressure vessel to a condition under atmospheric pressure.

To blow a polymerizate as powdery state from a heated long tube is thus an important issue.

Further, the cooling crusher has a complex structure and is costly, and if it is attempted to produce many different types of powders with one apparatus, its complex structure makes cleaning difficult when changing over from one product to the other product. In particular, it was found that this problem constitutes a considerable obstacle industrially when the non-volatile component is the objective product.

According to past experience, when the long tube was heated, hot water is used as heating medium if a temperature of 100° C. or below was desired, or steam is used if the temperature was 100° C. or above. An example of the former process is disclosed in JP-B-61-14777 ("JP-B-" means examined Japanese patent application), and an example of the latter in JP-A-58-79501 and JP-A-6090001. If said methods are applied to a polymerizate of low softening point, however, the heat capacity of hot water is insufficient, and then only a thick sticky liquid can be obtained. If on the other hand, steam at 100° C. or over is used as in the latter method, a powdery polymerizate is blown out. As this has a low softening point, however, it is soft, and the powder sticks together to form lumps or adhere to the wall of the reduced pressure vessel, and cannot be drawn off.

SUMMARY OF THE INVENTION

The present invention was conceived to overcome the above problems. One object of the invention is to provide a drying method wherein an organic compound for use in a photograph, and in particular a polymerizate with photographically useful groups, can be separated from a solution, wherein different compounds can be easily produced with one apparatus, and wherein the cost of the equipment is low.

The objects of this invention are achieved by:

(1) A method of vacuum drying a solution of a material to be dried, characterized in that the solution which has been adjusted to 1–50 centipoise is supplied to a steam-heated long tube, the solid-vapor mixture of powdery dry material and vapor produced in the heating tube is blown out in a reduced pressure atmosphere, and the powdery dry material and vapor are separated so as to obtain powdery dry material;

(2) the method of vacuum drying as in (1) above, wherein the solution has been adjusted to 1–20 centipoise.

(3) the method of vacuum drying a solution as in (2) above, wherein the steam supplied to the steam-heated long tube is at a temperature of 50°–100° C.; and (4) the method of vacuum drying as in (2) and (3) above, wherein the material to be dried is a polymerizate having photographically useful groups.

DETAILED DESCRIPTION OF THE INVENTION

Figure 1:
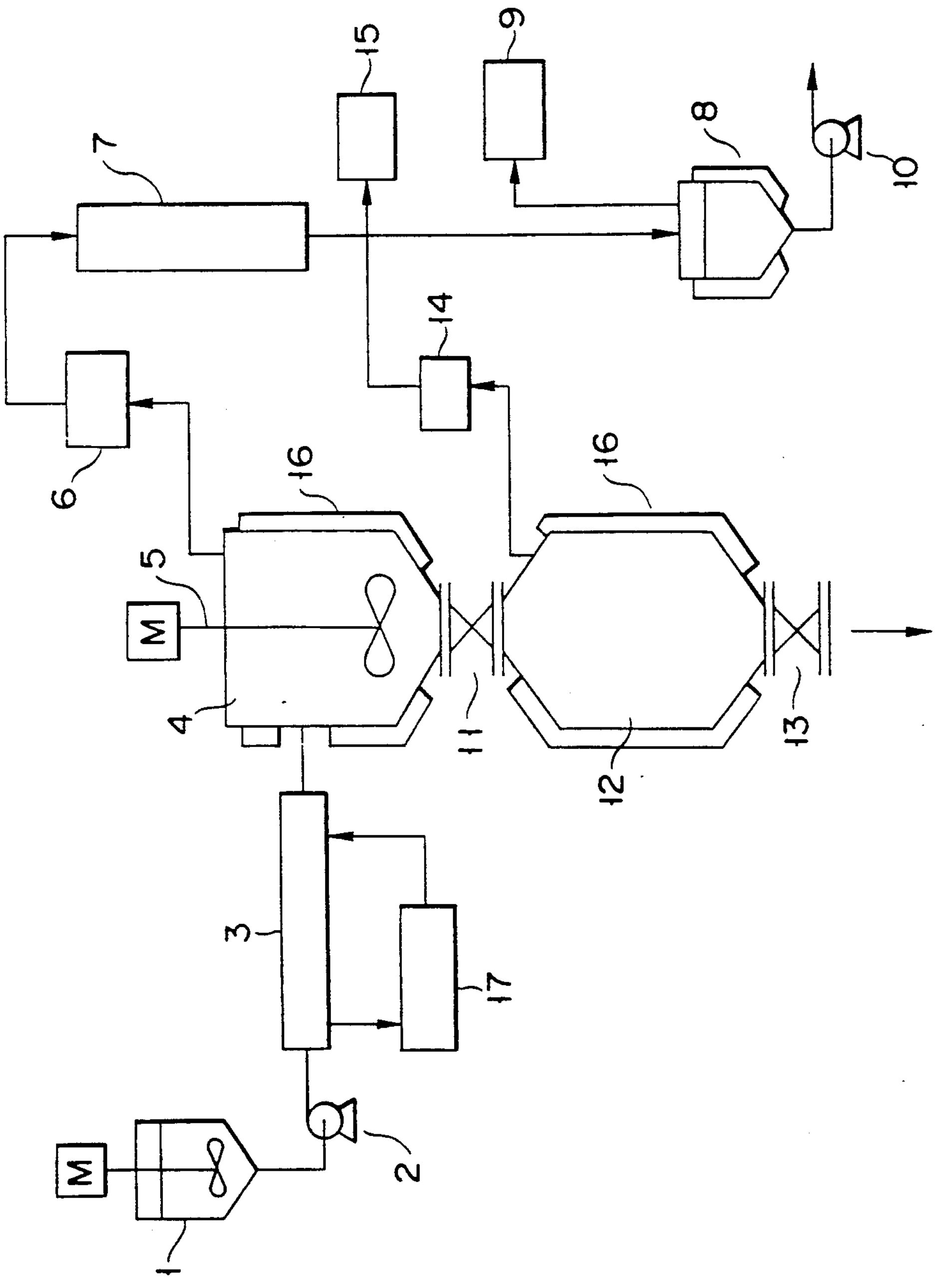
FIG. 1 is a schematic drawing of the equipment which can be used in the vacuum drying method of this invention.

We shall now describe this invention in more detail.

The action of the vacuum drying method using a heating tube is generally explained by the successive formation of 4 regions as follows:

(1) a laminar preheating region where the temperature of the solution is increased by sensible heat up to its boiling point, (2) a bubbling region where volatile components are partially evaporated by latent heat of vaporization so as to form minute bubbles, (3) a thin film evaporating region where evaporation proceeds further, vapor passes the center of the tube, and the solution becomes more concentrated on the tube walls, (4) a crystallizing region where substantially all of the volatile components in the solution are vaporized, and the great expansion of the volume has the powerful effect which scrapes the concentrated material off the tube wall thereby forming a solid-gas (vapor) two phase flow.

The inventor of the present invention, as a result of intensive research, found that by diluting the solution of the material to be dried, for example a solution of a polymerizate, with solvent which has boiling point of preferably 40°-160° C. under normal pressure such that its viscosity is adjusted to 1-50 cps, and supplying of the diluted solution to a steam-heated long tube at a constant flow rate, a powdery dry material which contains no sticky material whatever can be blown out of the heating tube This is due to the successful formation of the above mentioned thin film evaporation region and crystallization region inside the heating tube, and it can be explained as follows. When the viscosity of the solution supplied is high, the solution in the thin film evaporating region in the neighborhood of the tube wall becomes more concentrated, and heat transfer from the wall falls sharply. It is thought that as a result, evaporation cannot proceed properly toward the center of the tube, the material blown out of the tube is a sticky solution, or massive material containing sticky material.

On the other hand, it is conjectured, when the viscosity of the solution supplied is low, evaporation of solvent is greater, and due to the scraping effect mentioned above, heat transfer in the thin film evaporating region is adequate.

Dilution with solvent is not desirable from an energy or a productivity viewpoint. However, from the overall viewpoint this method makes it possible to convert a solution of a polymerizate to powdery state in one step, it does offer a considerable economic advantage.

The inventor of the present invention found that by supplying a polymerizate solution of 1-20 cps to a steam-heated long tube whose temperature is maintained with water vapor the temperature of which is controlled to be 50°-100° C. (referred to hereafter as low-pressure steam), it can be prevented that the powdery polymerizate blown out of the end of the tube sticks together. The low-pressure steam mentioned here is water vapor at 100° C. or less, and preferably at 50°-100° C., produced by for example the method disclosed in JP-A-60-64108. It is, however, also possible to produce low-pressure steam by analog instruments, and the method of producing low-pressure steam is not limited to that given here.

In this way, by adjusting the solution of the material to be dried to 1-50 cps, more preferably 1-20 cps and most preferably 2-10 cps, supplying it, preferably at a constant flow rate, to a steam-heated long tube, blowing out the solid/gas mixture of the powdery material to be dried and vapor, produced in the tube, to a reduced pressure atmosphere (referred to hereafter also as "to a reduced pressure vessel"), and separating the powdery material to be dried and gas, a powdery material to be dried can be obtained, and in particular, in the case of a polymerizate solution of 1-20 cps, by passing low-pressure steam at 50°-100° C. through the heating tube, adhesion of the blown-out powder in the reduced pressure vessel can be prevented, and powdery dry material to be dried can be obtained either continuously or intermittently without damage to the equipment. Further, if polymerizates, preferably, polymers (to be defined later) are used as the material to be dried, this method gives remarkable results.

This invention may be implemented by suitably choosing equipment conditions and choosing operating conditions, such as the internal diameter and length of the steam-heated long tube, supply rate and degree of reduced pressure of the vacuum vessel, within the limits known to those skilled in the art.

The steam-heated long tube used in this invention may be a double-pipe tube of the prior art, for example the tube disclosed in Japanese Utility Model No. 1222088 (Orient Kagaku Kogyo K.K., JP-B-52-28862).

The length of the inner tube through which the solution of the material to be dried passes should preferably be 100 to 10,000, more preferably 500-2,000 times its internal diameter. The internal diameter of the inner tube of the steam-heated long tube should be 3-50 mm, more preferably 10-25 mm.

Any outer tube which surrounds this inner tube may be used provided it is of such a form that heating steam can be passed through it, and it may typically be cylindrical.

The material of the inner tube should preferably be a stainless steel such as SUS-304 or 316 from the viewpoint of anti-corrosion properties, and for the outer tube, gas piping such as SGP may be used.

One end of the inner tube of the steam-heated long tube is connected to the upper part of a vessel under reduced pressure (referred to hereafter also as a reduced pressure vessel). The vessel is a cylinder with a conical base. The conical shape is chosen for the base to facilitate removal of the dried powder.

The capacity of the vessel may be chosen freely depending on the hourly quantity processed. This capacity also varies depending on the bulk density of the material to be dried and the quantity that is to be temporarily stored, but it may typically be 100-10,000 liter, and more preferably, 500-2,000 liter.

To maintain the whole vessel at a different temperature to that of the environment, any suitable means, preferably a means which can automatically control temperature, may be provided.

As the material to be dried, an organic compound is preferable, and while this may of course be of low molecular weight, the method can also be applied to a compound of high molecular weight. It is especially suited to organic compounds with a low melting point, more specifically a melting point in the range 40° to 100° C., and polymerizates with a low glass transition temperature, for example 30°-100° C. and in particular 35°-80° C., and the like.

If such substances with a low melting point or a low glass transition temperature are used as materials to be dried, the use of low-pressure steam is preferable.

In this invention, the word "polymerizate" has a wide range of meaning, including both addition polymerizates and polycondensation polymerizates, and including polymerizates with a number-averaged molecular weight from 1,000-1,000,000. Further, in this invention, the term "polymer" refers to addition polymerizates and particularly vinyl polymers with a molecular weight of 10,000 or more, the same definition being applied to the term polymer in the expression "polymer coupler". Further, in this invention, the term "telomer" refers to addition polymerizates and particularly vinyl polymers with a number-average molecular weight of 1,000–10,000, the same definition being applied to the term telomer in the expression "telomer ooupler".

The glass transition temperature may be easily determined by, for example, differential thermal analysis.

Polymerizates with a low glass transition temperature include polycondensation polymerizates and addition polymerizates, typical examples being the chain polymers obtained by the polymerization of so-called vinyl monomers, and typical weight-average molecular weights being 1,000–500,000.

In this invention, the material to be dried is supplied as a solution which has been adjusted to 1–50 centipoise (cps), and preferably at a constant flow rate, to a steam-heated long tube. Viscosities specified in this invention are absolute viscosities at 25° C.

The solvent used to dissolve the material to be dried, such as a polymerizate for example, may be any solvent provided it has a boiling point in the range 40°–160° C. at normal pressure, and preferably one which is a good solvent for the material to be dried. It is still more preferable that the solvent has a boiling point in the range 40°–120° C. at normal pressure. If the boiling point of the solvent is above 160° C. at normal pressure, a heating medium at 180° C. or more is required for the long tube, with the result that the powdery material to be dried is not obtained and the product is partially molten. Even if the powdery material to be dried is obtained, it sticks together in the vacuum vessel or to the walls of the vessel, and the process does not go smoothly. If on the other hand the boiling point of the solvent is at 40° C. or below, an extremely large condensation vessel is required when recovering evaporated solvent, and the process loses its industrial value.

We shall describe the method of adjusting the polymerizate solution to 1–50 cps. If the polymerization reaction solution is within the above limits there is no need to perform any adjustment, however if the viscosity is above 50 cps, it must be diluted with a suitable solvent to give a homogeneous solution. It is preferable that 80 volume % or more of the solvent comprises a good solvent for the polymerizate. The actual degree of dilution to be made is intricately linked to, for example, the molecular weight of the polymerizate, its concentration and its softening point, but in general the final concentration will be 0.1–40 wt %.

Constant flow rate supplying may be performed by any suitable device, and it may be performed with or without pulsation. The preferred quantity of solution to be supplied depends on the heat transfer area defined by the internal diameter and length of the heated part of the duplex tube. If the quantity supplied is too great, the material to be dried becomes sticky, and if the quantity is too small, blockages occur in the tube. The optimum quantity may be determined by preliminary tests.

By suitably choosing the quantity of solution supplied, a solid/gas mixture consisting of powdery dry material and vapor is produced in the heating tube, and by blowing this mixture into a vessel under reduced pressure, the powdery dry material and solvent vapor are separated. In this case, a suitable reduced pressure is 3–500 Torr, more preferably 30–200 Torr.

Examples of polymerizates which can be applied to this invention are polymerizates with photographically useful groups.

Examples of such polymerizates are typical oil soluble polymer couplers. The monomer couplers and polymer initiators of polymer coupler, used to synthesize these polymerizates, are disclosed in JP-A-59-42543 (Patent Application No. 57-153452) by Yagihara et al. Monomer couplers which are used preferably are disclosed in the reference, page (3), upper right column, line 5 to page (13), upper right column, and methods of manufacturing them are disclosed as (1)–(25), on page (18), lower left column.

These are obtained by copolymerization of couplers with vinyl groups (monomer couplers) and vinyl monomers without photographically useful groups. Examples of photographically useful groups of polymerizates which can be used in this invention include group known to those skilled in the art such as ultra-violet absorbent (for example as disclosed in JP-B-63-53541 and JP-A-58-178351), dyes, redox (reduction-oxidation) groups, and cationic residue groups useful as mordants.

Specific examples of oil soluble polymer couplers are disclosed in the following references.

Pyrazolone magenta polymer couplers are disclosed, for example, in U.S. Pat. No. 3,767,412, U.S. Pat. No. 3,623,871, U.S. Pat. No. 4,207,109, U.S. Pat. No. 3,424,583, U.S. Pat. No. 3,370,952, JP-A-57-94742, JP-A-58-28745, JP-A-58-120252, and JP-A-57-94752.

Pyrazoloazole magenta polymer couplers are disclosed, for example, in JP-A-59-228252, JP-A-59-171956, JP-A-60-220346, and Research Disclosure 25724.

Other useful oil soluble polymer couplers are disclosed, for example, in U.S. Pat. No. 3,451,820, JP-A-60-46555, JP-A-58-145944 and JP-A 60-158365, and polymer couplers which have a relatively low molecular weight the average molecular weight being in the range 1000–10,000, (these polymers are also known as telomer couplers), are disclosed in JP-A-62-276548 and JP-A-62-278547, and may be dried according to the method of this invention.

Specific examples of lipophilic polymer couplers to which this invention can be applied are given in Table 1, and specific examples of telomer couplers are given in Table 2.

Further, specific examples of monomers that can be used in the manufacture of polymerizates to which this invention can be applied are given later in Table 3.

The compound numbers in the coupler monomer columns of Table 1 and Table 2 correspond to the compound numbers shown in Table 3.

TABLE 1

| Lipophilic Polymer Couplers | | | | | |
|---|---|---|---|---|---|
| Lipophilic polymer coupler | Coupler monomer: Compound number | Coupler monomer: Quantity used (g) | Copolymer monomer: Symbol** | Copolymer monomer: Quantity used (g) | Coupler content* (wt %) |
| P-1 | M-13 | 20 | BA | 10 | 49.2 |
| | | | MA | 10 | |
| P-2 | M-14 | 20 | EA | 20 | 48.5 |
| P-3 | M-21 | 20 | BA | 20 | 50.3 |
| P-4 | M-24 | 20 | MAA | 5 | 49.6 |
| | | | BA | 15 | |
| P-5 | M-30 | 20 | St | 10 | 49.1 |
| | | | BA | 10 | |
| P-6 | M-42 | 20 | BA | 30 | 40.8 |
| P-7 | M-43 | 20 | 2-EHA | 15 | 51.9 |
| | | | t-BAM | 5 | |
| P-8 | M-44 | 20 | BA | 15 | 58.5 |
| P-9 | C-2 | 20 | MA | 20 | 52.0 |
| P-10 | C-4 | 20 | BA | 20 | 48.7 |
| P-11 | C-9 | 20 | MA | 20 | 42.1 |
| | | | MAA | 5 | |
| P-12 | C-14 | 20 | BA | 10 | 50.3 |
| | | | t-BAM | 10 | |

TABLE 1-continued

| | Lipophilic Polymer Couplers | | | | |
|---|---|---|---|---|---|
| | Coupler monomer | | Copolymer monomer | | |
| Lipophilic polymer coupler | Compound number | Quantity used (g) | Symbol** | Quantity used (g) | Coupler content* (wt %) |
| P-13 | C-15 | 20 | BA | 10 | 52.6 |
| P-14 | C-18 | 20 | EA | 25 | 41.4 |
| P-15 | C-20 | 20 | BA | 20 | 48.5 |
| P-16 | C-8 | 20 | MA | 8 | 53.8 |
| | | | DAAM | 12 | |
| P-17 | Y-1 | 20 | BA | 20 | 50.2 |
| P-18 | Y-2 | 20 | 2-EHA | 30 | 38.2 |
| P-19 | Y-5 | 20 | BA | 25 | 44.6 |
| P-20 | Y-6 | 20 | BA | 15 | 49.3 |
| | | | St | 5 | |
| P-21 | Y-7 | 20 | BA | 20 | 51.5 |
| P-22 | Y-12 | 20 | MA | 20 | 48.6 |
| P-23 | Y-13 | 20 | BA | 15 | 42.1 |
| P-24 | Y-15 | 20 | BA | 20 | 50.7 |

*Coupler content is proportion of coupler monomer units in the polymerizate
**Symbols
MA: Methyl acrylate
BA: n-butyl acrylate
MAA: Methacrylic acid
t-BAM: t-butyl acrylamide
EA: Ethyl acrylate
2-EHA: 2-methylhexyl acrylate
DAAM: Diacetone acrylamide
St: Styrene

TABLE 2

| | Telomer Couplers | | | | | | |
|---|---|---|---|---|---|---|---|
| | Chain transfer agent | | Coupler monomer | | Copolymer monomer | | |
| Telomer coupler | Compound number | Quantity used (g) | Compound number | Quantity used (g) | ** Symbol | Quantity used (g) | Coupler content (wt.%) |
| P-66 | $C_{12}H_{25}SH$ | 10 | M-13 | 50 | BA | 10 | 62.8 |
| | | | | | MA | 10 | |
| P-67 | $C_{18}H_{37}SH$ | 15 | M-21 | 50 | EA | 15 | 68.3 |
| P-68 | $C_{12}H_{25}SH$ | 15 | M-24 | 50 | BA | 15 | 67.2 |
| P-69 | $C_{14}H_{29}SH$ | 10 | M-30 | 50 | St | 10 | 66.9 |
| | | | | | BA | 10 | |
| P-70 | $C_{12}H_{25}SH$ | 10 | M-42 | 50 | MA | 5 | 70.1 |
| | | | | | BA | 10 | |
| P-71 | $C_{12}H_{25}SH$ | 10 | C-4 | 50 | MA | 10 | 72.5 |
| P-72 | $C_{14}H_{29}SH$ | 12 | C-8 | 20 | 2-EHA | 10 | 68.2 |
| | | | | | t-BAM | 5 | |
| P-73 | $C_{12}H_{25}SH$ | 8 | C-14 | 50 | BA | 5 | 80.4 |
| P-74 | $C_{12}H_{25}SH$ | 10 | C-15 | 50 | MA | 10 | 72.7 |
| P-75 | $C_{18}H_{37}SH$ | 10 | C-18 | 50 | EA | 20 | 65.4 |
| P-76 | $C_{14}H_{29}SH$ | 8 | C-20 | 50 | MA | 15 | 61.2 |
| | | | | | St | 10 | |
| P-77 | $C_{12}H_{25}SH$ | 15 | Y-1 | 50 | BA | 10 | 59.3 |
| | | | | | t-BAM | 10 | |
| P-78 | $C_{12}H_{25}SH$ | 12 | Y-5 | 50 | BA | 15 | 65.0 |
| P-79 | $C_{12}H_{25}SH$ | 15 | Y-6 | 50 | EA | 20 | 57.1 |
| P-80 | $C_{18}H_{37}SH$ | 12 | Y-12 | 50 | BA | 25 | 58.5 |
| P-81 | $C_{12}H_{25}SH$ | 10 | Y-13 | 50 | BA | 15 | 58.2 |
| | | | | | DAAM | 10 | |
| P-82 | $C_{12}H_{25}SH$ | 15 | Y-14 | 50 | BA | 10 | 67.5 |

*Coupler content is proportion of coupler monomer units in the polymerizate
**Symbols
MA: Methyl acrylate
EA: Ethyl acrylate
BA: n-butyl acrylate
2-EHA: 2-methylhexyl acrylate
MAA: Methacrylic acid
DAAM: Diacetone acrylamide
t-BAM: t-butyl acrylamide
St: Styrene According to the vacuum drying method of this invention, low-molecular-weight oil-soluble couplers, for color developing or telomers or polymers containing e.g. coupler residue groups, redox residue groups or ultra-violet absorbent residue groups, may be easily obtained from its solution in the form of a dry powder with very little residual solvent. In particular, a dry powdery material can still be obtained if the method is applied to oil soluble polymers with a glass transition temperature of 30°-100° C. Further, this method gives a polymer coupler which, when used as a color photosensitive material, gives little background fog and has excellent coloring properties in comparison to the product dried by the known method of reprecipitation.

EXAMPLES

Example 1

A solution of a material to be dried was dried using vacuum drying equipment having the construction shown in FIG. 1. A glass window was installed in the upper wall of first reduced pressure vessel 4 so as to be able to observe the state of the powdery material blown, and the interior of the vessel.

The sample to be dried was a oil soluble polymer magenta coupler having weight-average molecular weight of $30\times10^4$ (determined by GPC based on monodispersed polystyrene) and a glass transition temperature Tg of 70° C. (determined by DSC). Its repeating unit and copolymerization ratio expressed as wt % is as follows:

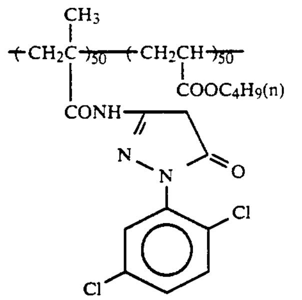

250 kg of a homogeneous solution containing 30 wt % of a sample to be dried in toluene/n-BuOH (9:1 W/W), was diluted with ethyl acetate to give a homogenous solution containing 10 wt % of the sample to be dried. The viscosity of this solution was 3 cps (measured at 25° C. by a B type viscosimeter). This solution was delivered by constant rate pump 2 at a constant flow rate of 50 liter/hr from dilute solution tank 1 to one end of steam-heated long tube 3 in which pressurized steam at 121° C. was passed, and the product was blown from the other end of the tube into first reduced pressure vessel 4. First reduced pressure vessel 4 had been previously evacuated to a vacuum of 20–40 Torr by vacuum generator 9, and hot water at 40° C. had been circulated in jacket 16 such that solvent vapor did not condense.

It was confirmed that said solution supplied at a constant rate was blown out continuously from the other end of said heating tube as a powder/gas mixture. On the otherhand, solvent vapor was passed through 1st bag filter 6, condensed by condenser 7 and collected in solvent tank 8.

When there was no more solution in diluted solution tank 1, 100 liter of ethyl acetate was added to the tank, and the solution in the steam-heated long tube swept out with ethyl acetate vapor by operating the system under the same conditions.

The powder in 1st reduced pressure vessel 4 occupied about 70% of its volume. First valve 11 was then opened and, while operating stirrer 5 which so far had been at rest, the powder was transferred to 2nd reduced pressure vessel 12 which had been previously evacuated via 2nd bag filter 14 to 20–40 Torr by 2nd vacuum generator 15. When the transfer of powder to the 2nd vacuum vessel was complete, the 1st valve was shut and the stirrer 5 was stopped.

Next, the 2nd reduced pressure vessel 12 was put under atmospheric pressure, 2nd valve 13 was opened, and the powdery material was withdrawn outside the system.

It was found that in moving the powder from the 1st reduced pressure vessel to the 2nd reduced pressure vessel, the opening and closing operation of the 1st valve and the rotation operation of the stirrer went smoothly, and all the powder was transferred to the 2nd reduced pressure vessel. Further, when the 1st reduced pressure vessel was observed through the window, it was found that there was no adhesion of powder at all to the walls of the vessel or to the stirrer. Further, the powder removed from the system was in the state of dry powder and contained 2.0 wt % of volatile constituents.

Comparative Example (Comparison with Example 1)

The operations were carried out in the same way as Example 1 except that the homogeneous solution containing 30 wt % of a sample to be dried in toluene/n-BuOH (9:1 W/W) was not diluted. The absolute viscosity of this solution was 70 cps.

The material blown out from the end of the steam-heated long tube was a sticky material.

Example 2

A polymerization was carried out to prepare a sample to be dried as in Example 1, the copolymer ratio of monomer containing 5-pyrazolone and butyl acrylate being changed to 45/55 (by weight), and a oil soluble polymer coupler having a weight-average molecular weight Mw of $7\times10^4$ and glass transition temperature Tg of 35° C. was obtained. 250 kg of a homogeneous solution containing 30 wt % of this polymer coupler in ethyl acetate/IPA (70:30 W/W), was diluted with ethyl acetate to give a homogenous solution containing 12 wt % of the sample. The viscosity of this solution was 2 cps (centipoise) (measured at 25° C. by a B type viscosimeter).

The diluted solution was delivered at a constant flow rate of 80 liter/hr from to the steam-heated long tube in which low-pressure steam at 95° C., supplied by low-pressure steam generator 17, was passed. Well water at 18° C. was circulated through jacket 16 of the 1st reduced pressure vessel. The other operations were the same as those of Example 1.

As in Example 1, it was found that the powdery material could be transferred smoothly from the 1st reduced pressure vessel to the 2nd reduced pressure vessel. It was also found that there was no adhesion of the powder at all to the interior of the 1st reduced pressure vessel. Further, the powdery material removed from the system contained 2.5 wt % of volatile constituents and was in the state of dry powder.

Comparative Example

The same operations as in Example 2 were carried out, except that pressurized steam at 121° C. was passed in heat the tube instead of low-pressure steam.

The material blown out from the tube was in a state of satisfactory powder, however when transferring this powder from 1st reduced pressure vessel to 2nd reduced pressure vessel, it stuck together, or adhered to the walls of the 1st reduced pressure vessel, the stirrer and 1st valve. The 1st valve could no longer be open and shut, and as a result, the powder in 1st reduced pressure vessel could not be removed from the system.

Example 3

250 kg of a solution containing 30 wt % of the oil soluble coupler (B) (mp=166° C.), in acetone was dried by carrying out the same operations as in Example 1. The viscosity of this solution was 2 cps.

As in Example 1, it was found that the powder could be transferred smoothly from the 1st reduced pressure vessel to the 2nd reduced pressure vessel. It was also found that there was no adhesion of the powder at all to the interior of the 1st reduced pressure vessel. Further, the powdery material removed from the system was in a state of dry powder containing 2.0 wt % of volatile constituents.

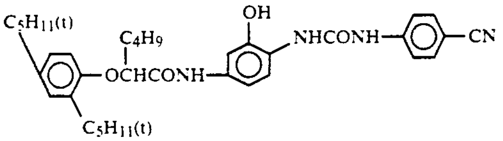

(B)

5-[2-(2,4-di-tert-amylphenoxy)hexanamido]-2-[3-(4-cyanophenyl)ureido]phenol

Example 4

The oil soluble polymer couplers (1)-(3) were vacuum dried by the method based on the method of Example 1. These couplers and the solutions had the following characteristics:

Coupler (1):
Weight-averaged molecular weight=250,000
Tg=65° C.
Viscosity of solution=3 cps
Coupler (2):
Weight-averaged molecular weight=30,000
Tg=75° C.
Viscosity of solution=12 cps
Coupler (3):
Weight-averaged molecular weight=40,000
Tg=55° C.
Viscosity of solution=18 cps All the couplers were obtained in a state of dry powder containing no more than 2.0% wt % of volatile constituents.

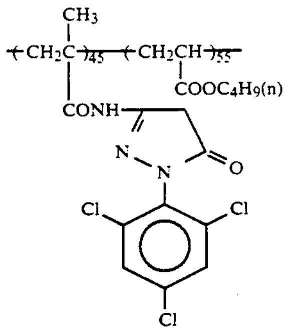

Coupler (1)

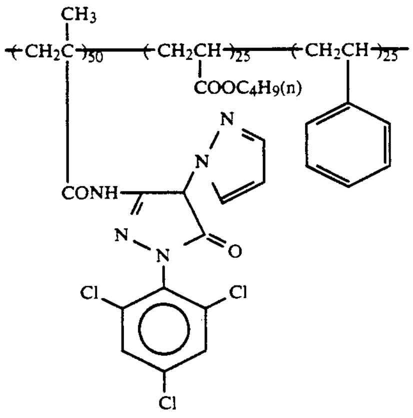

Coupler (2)

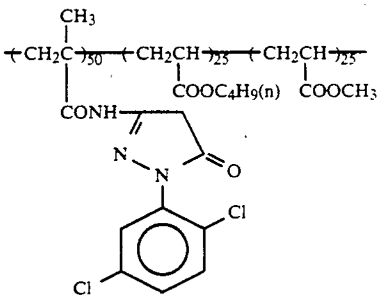

Coupler (3)

Tables 3

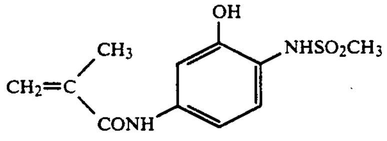

(C-1)

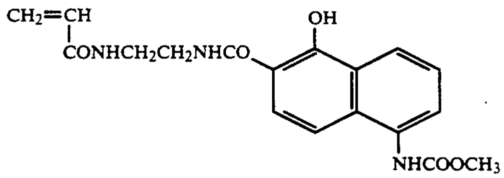

(C-2)

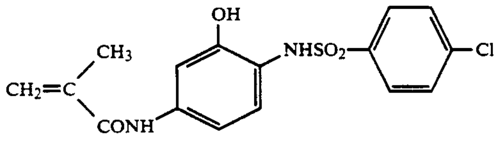

(C-3)

-continued
Tables 3
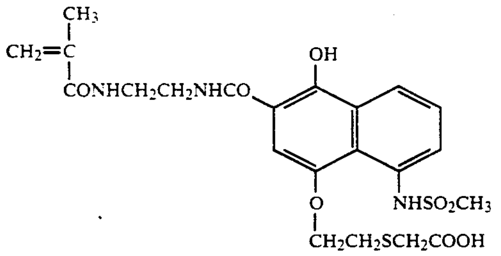
(C-4)
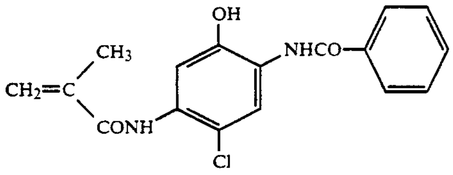
(C-5)
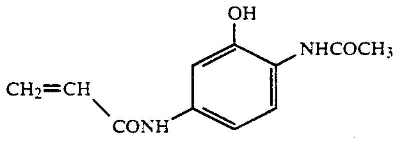
(C-6)
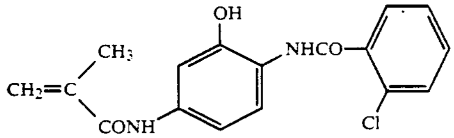
(C-7)
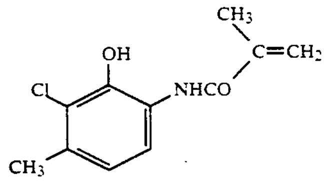
(C-8)
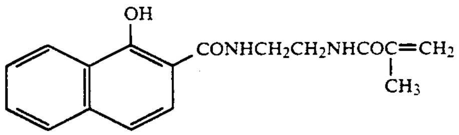
(C-9)
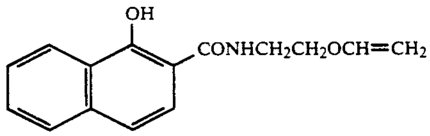
(C-10)
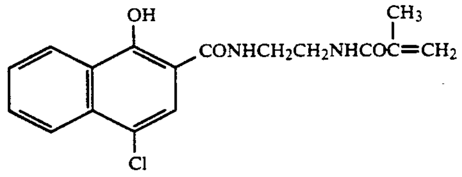
(C-11)
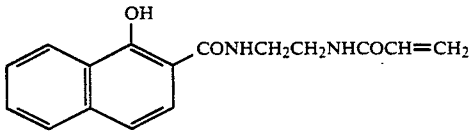
(C-12)

-continued
Tables 3
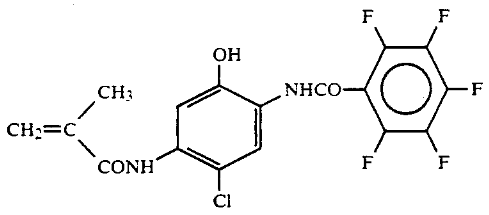
(C-13)
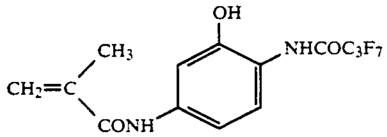
(C-14)
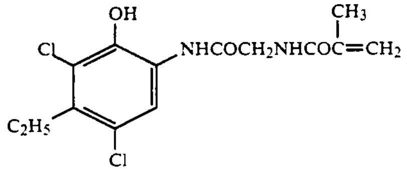
(C-15)
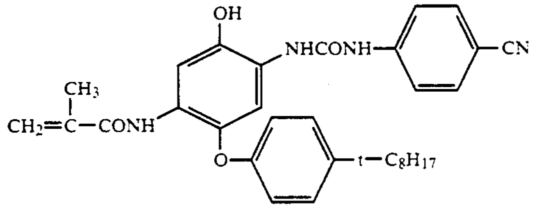
(C-16)
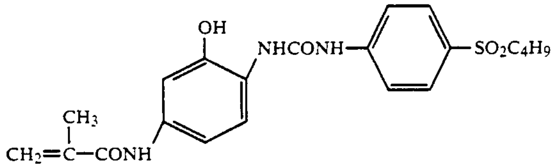
(C-17)
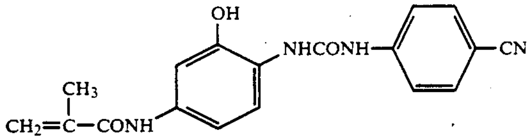
(C-18)
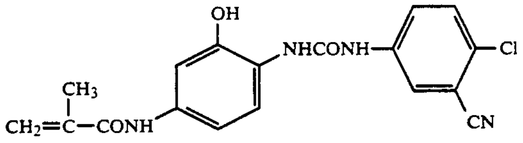
(C-19)
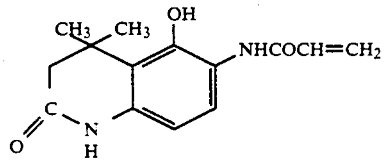
(C-20)

-continued
Tables 3
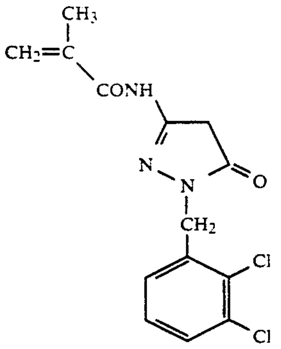
(M-1)
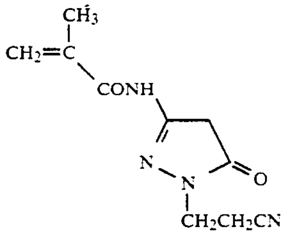
(M-2)
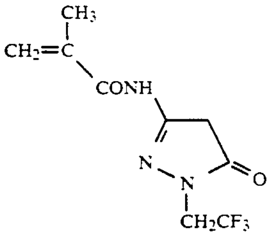
(M-3)
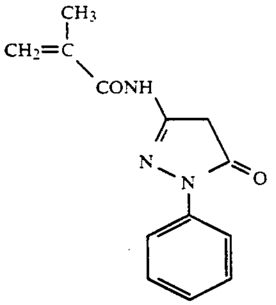
(M-4)
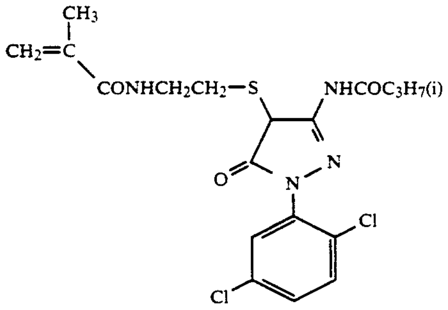
(M-5)

-continued
Tables 3
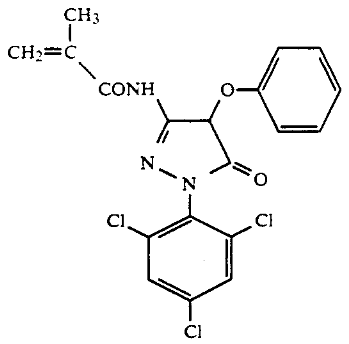
(M-6)
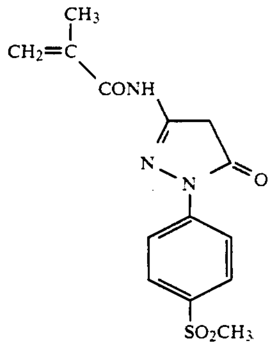
(M-7)
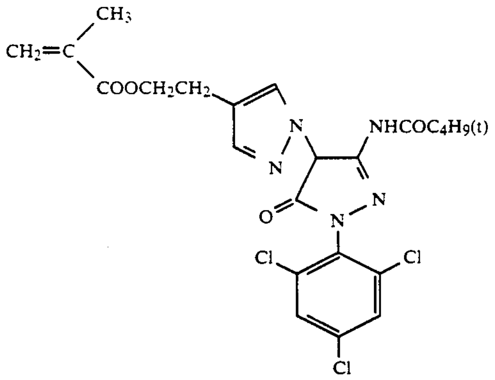
(M-8)
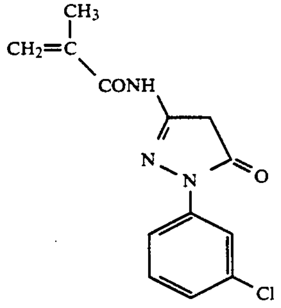
(M-9)

-continued
Tables 3
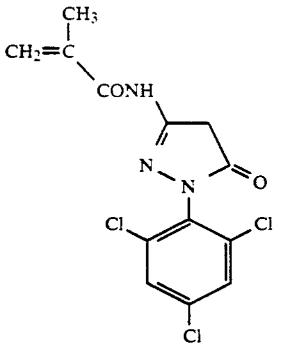
(M-10)
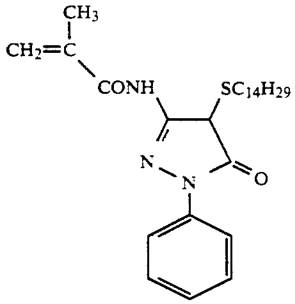
(M-11)
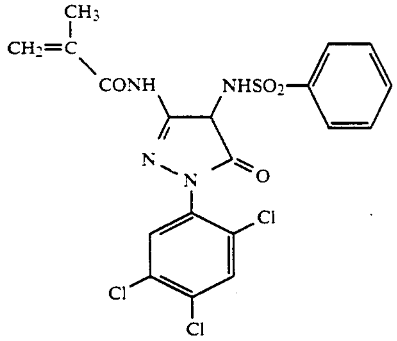
(M-12)
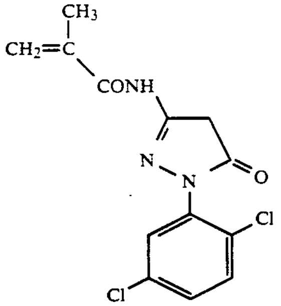
(M-13)
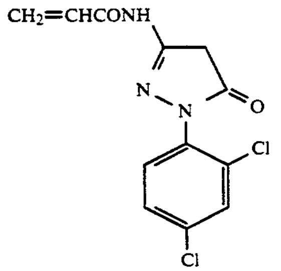
(M-14)

-continued
Tables 3
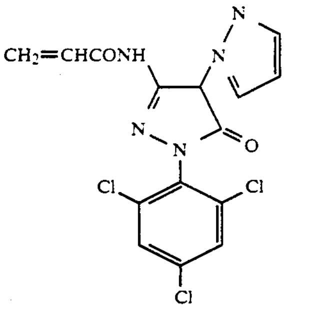
(M-15)
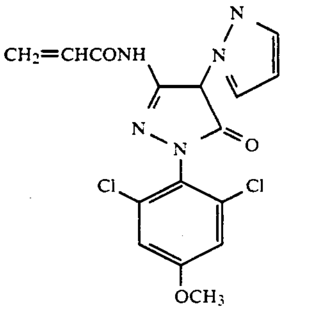
(M-16)
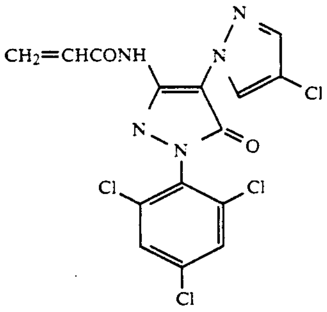
(M-17)
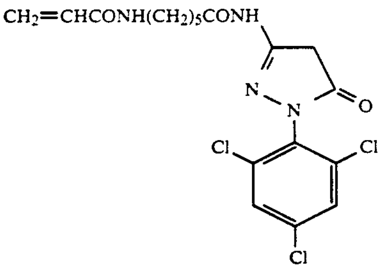
(M-18)
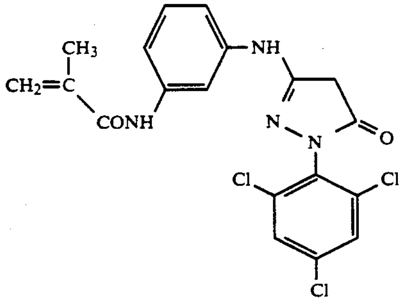
(M-19)

-continued
Tables 3
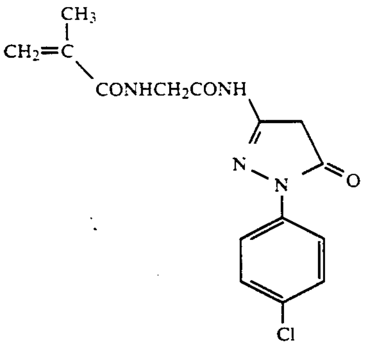
(M-20)
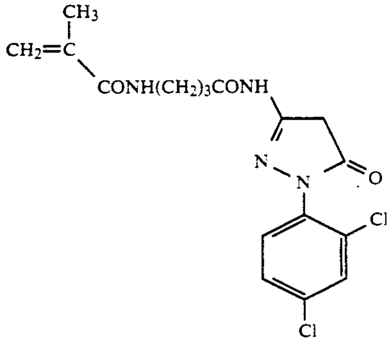
(M-21)
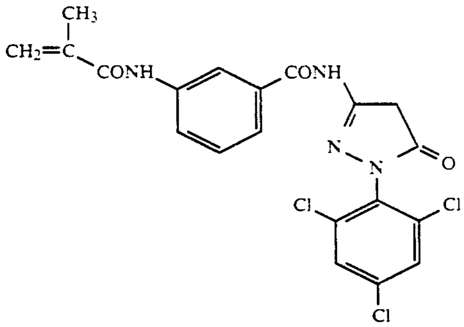
(M-22)
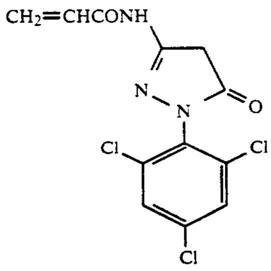
(M-23)
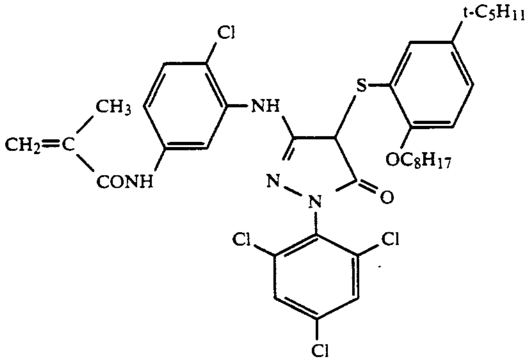
(M-24)

-continued
Tables 3
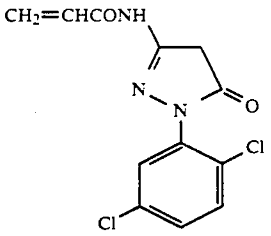
(M-25)
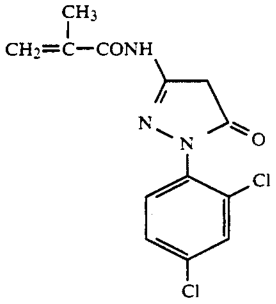
(M-26)
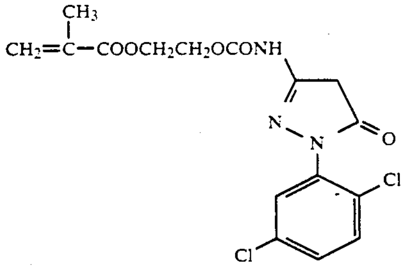
(M-27)
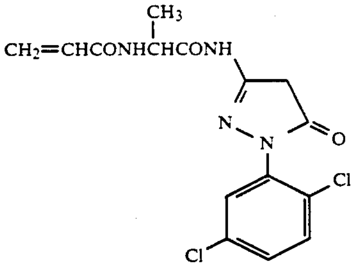
(M-28)
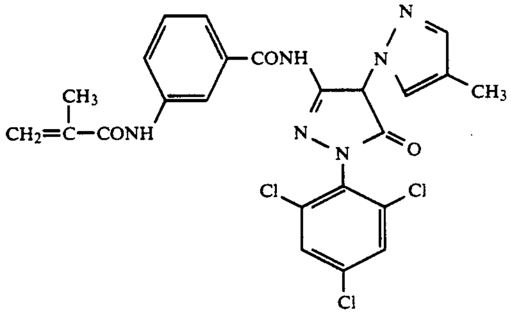
(M-29)

-continued
Tables 3
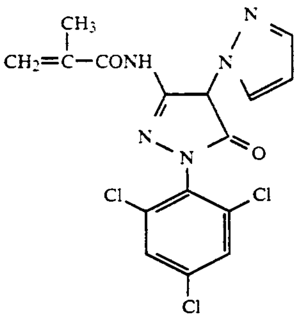
(M-30)
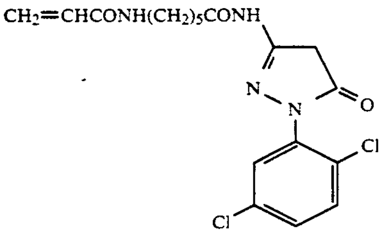
(M-31)
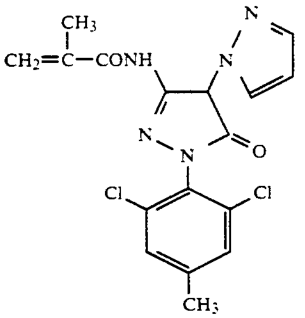
(M-32)
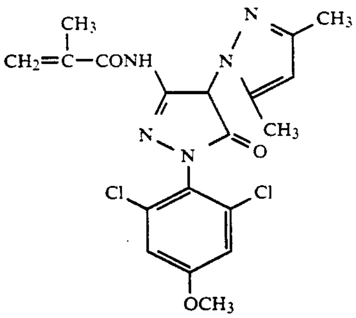
(M-33)
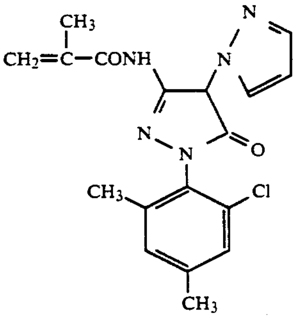
(M-34)

-continued
Tables 3
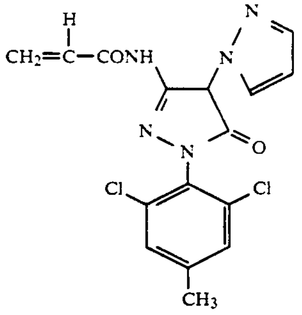
(M-35)
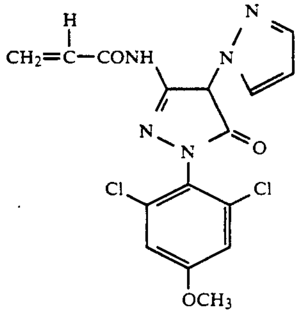
(M-36)
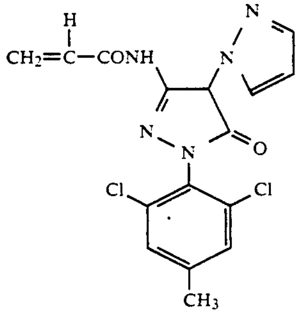
(M-37)
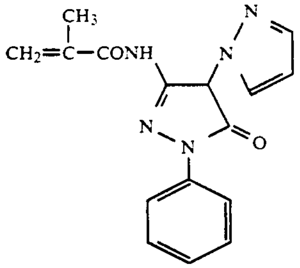
(M-38)
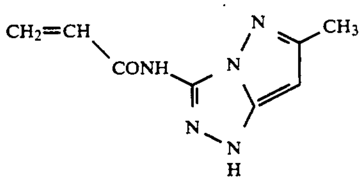
(M-39)
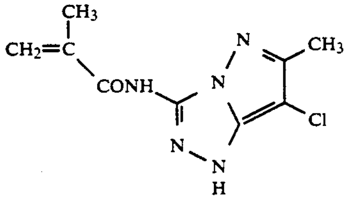
(M-40)

-continued
Tables 3
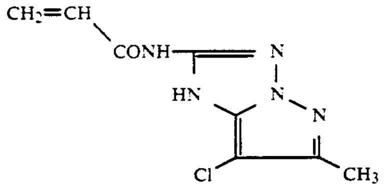
(M-41)
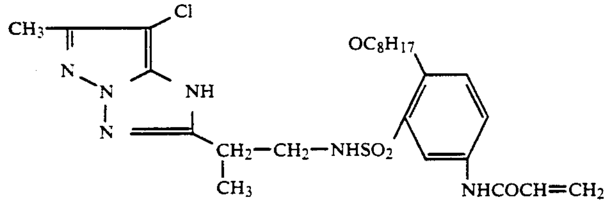
(M-42)
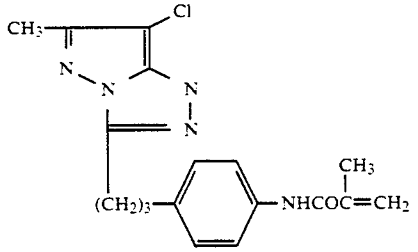
(M-43)
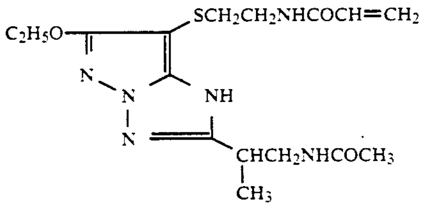
(M-44)
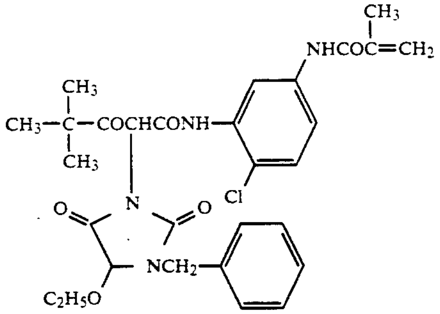
(Y-1)
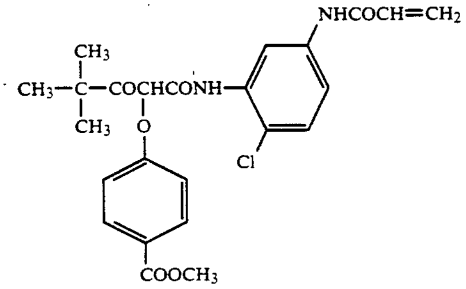
(Y-2)

-continued
Tables 3
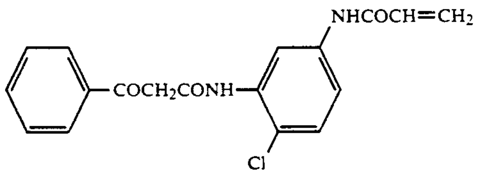
(Y-3)
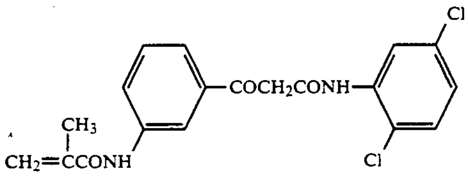
(Y-4)
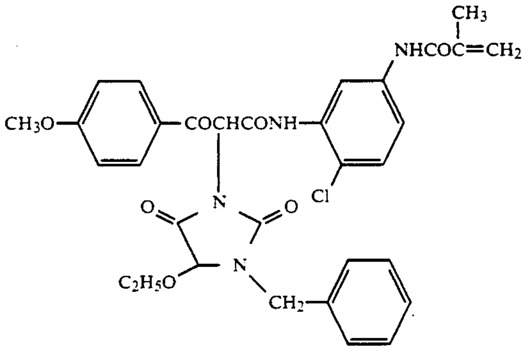
(Y-5)
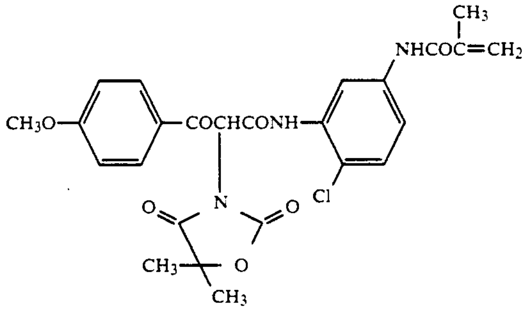
(Y-6)
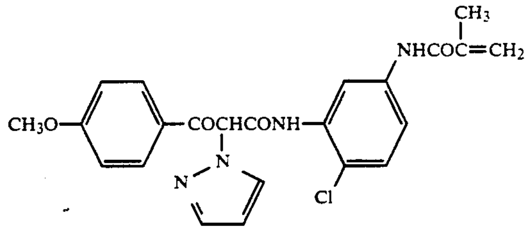
(Y-7)
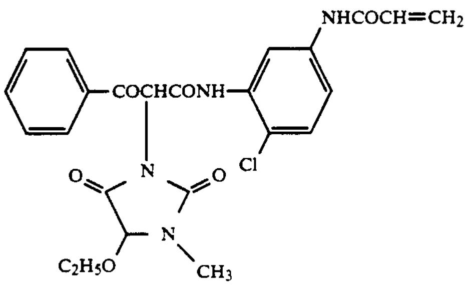
(Y-8)

-continued
Tables 3
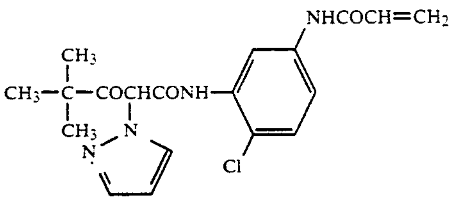
(Y-9)
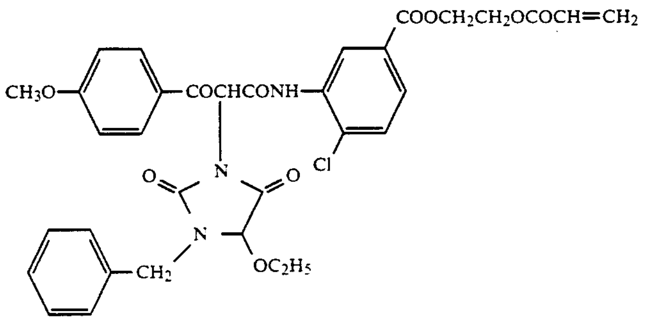
(Y-10)
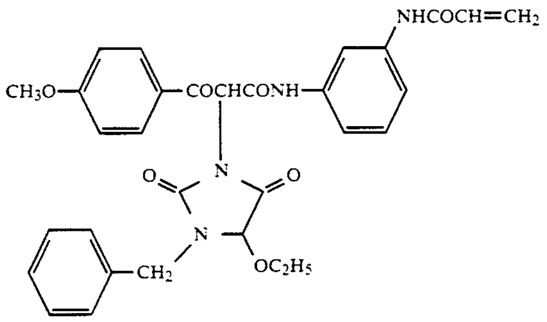
(Y-11)
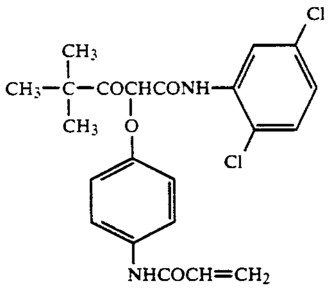
(Y-12)
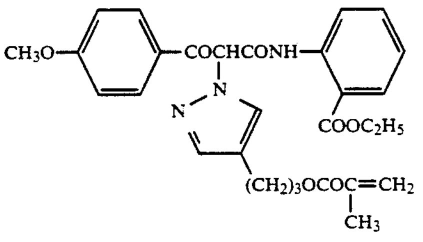
(Y-13)

-continued

Tables 3

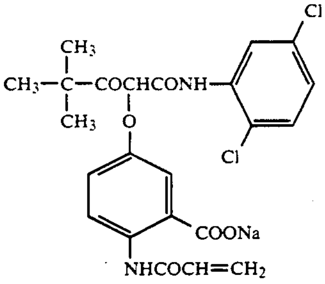

(Y-14)

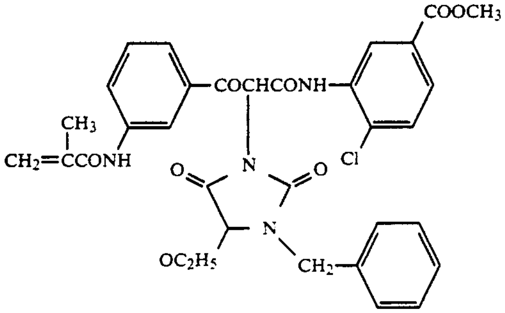

(Y-15)

What is claimed is:

1. A method of vacuum drying a solution of a material to be dried having a glass transition temperature of 30° C.-100° C., which comprises:

adjusting the viscosity of said solution of a material to be dried having a glass transition temperature of 30° C.-100° C. to 1-20 centipoise, wherein the solution viscosity is adjusted with a solvent having a boiling point of 40°-160° C. under normal pressure, supplying the viscosity-adjusted solution to a steam-heated long tube, wherein the steam supplied to said steam-heated long tube is at a temperature of 50°-100° C., blowing out of said tube under reduced pressure a solid-vapor mixture of powdery dry material and vapor produced in said tube, and separating the powdery dry material and vapor so as to obtain the powdery dry material.

2. The vacuum drying method as in claim 1, wherein the solution viscosity has been adjusted to 2-10 centipoise.

3. The vacuum drying method as in claim 1, wherein the material to be dried is a polymerizate having photographically useful groups.

4. The vacuum drying method as in claim 1, wherein said material to be dried has a glass transition temperature of 35° C.-80° C.

5. The vacuum drying method as in claim 1, wherein the viscosity-adjusted solution is supplied to the tube at a constant flow rate.

6. The vacuum drying method as in claim 1, wherein the length of the tube is 100 to 10,000 times its internal diameter.

7. The vacuum drying method as in claim 1, wherein the internal diameter of an inner tube of the steam heated long tube is 3-50 mm.

8. The vacuum drying method as in claim 1, wherein the powdery dry material is a low molecular weight oil-soluble coupler for color development, a telomer or a polymer containing coupler residue groups, redox residue groups or ultra-violet absorbent residue groups.

9. The vacuum drying method as in claim 1, wherein the steam is low pressure steam.

* * * * *